Patented Jan. 19, 1954

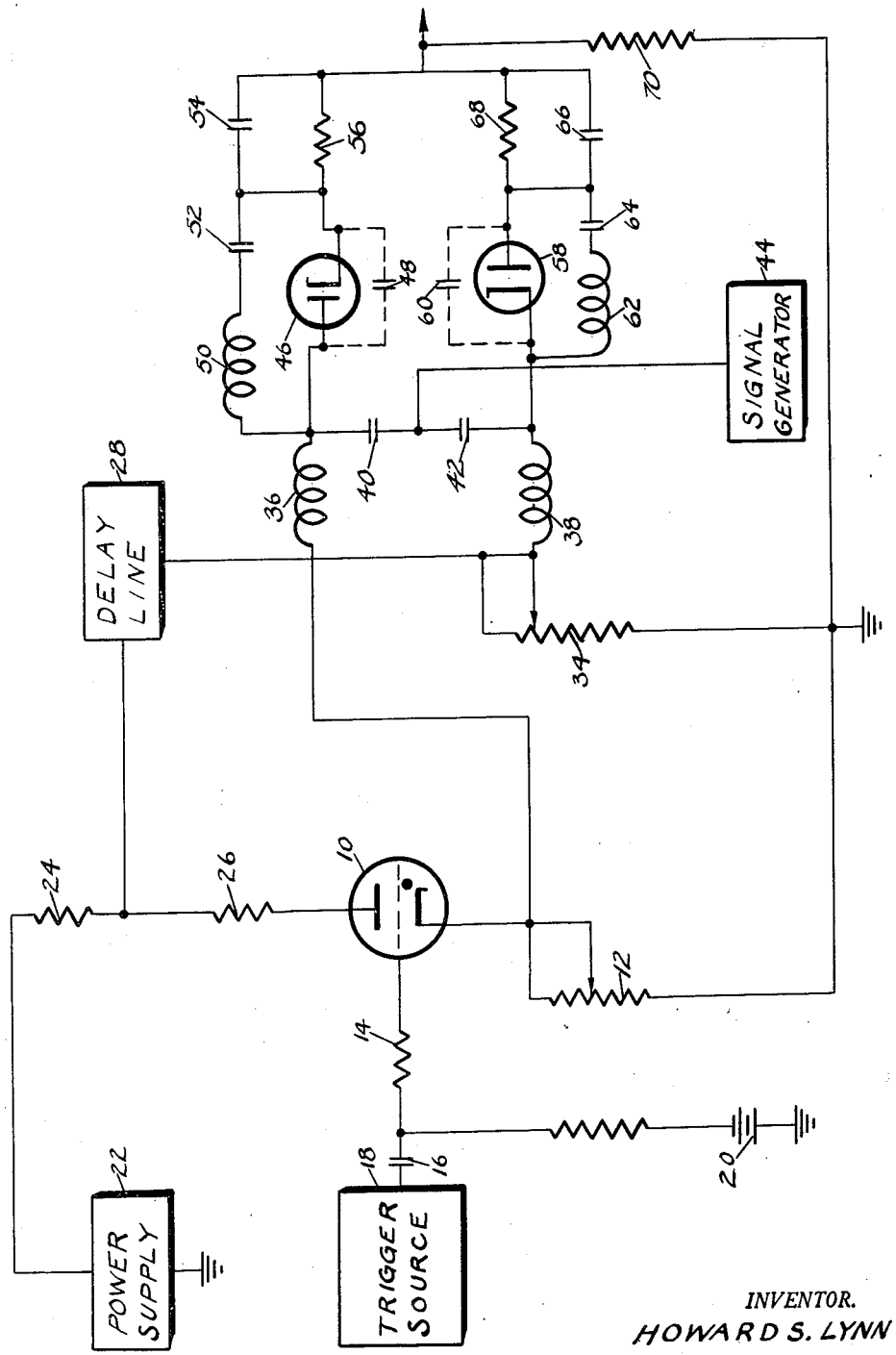
INVENTOR.
HOWARD S. LYNN
BY
Ellsworth R. Roston
ATTORNEY

2,666,901

UNITED STATES PATENT OFFICE 2,666,901

PULSE MODULATOR

Howard F. Lynn, Detroit, Mich., assignor to Bendix Aviation Corporation, Detroit, Mich., a corporation of Delaware Application November 29, 1951, Serial No. 258,798

9 Claims. (Cl. 332—9)

1

This invention relates to a pulse modulator and more particularly to a circuit for modulating high frequency signals with a pulse.

In many radar applications, pulses of energy are transmitted to a distant object and are reflected by the distant object back to the transmitting position to indicate such phenomena as the distance and direction of the distant object relative to the transmitting position. Each pulse of energy is formed by a pulse modulator from a predetermined number of signals having a relatively high frequency.

The pulse modulators now in use generally employ a signal generator operating push-pull. The signals from the generator are modulated by a voltage pulse in a mixer stage employing a multi-grid vacuum tube. Such pulse modulators have several basic disadvantages. The pulse modulators are relatively complex as a result of their use of push-pull generators. Furthermore, the number of standard generators which can be used is relatively limited in view of the fact that most generators do not have push-pull circuitry. This is especially important in test circuits where it is desired to test the operation of pulse apparatus without the necessity of building extra equipment such as generators.

The pulse modulators now in use also produce some distortion during modulation since the multi-grid mixing tube passes signals having frequencies represented by the modulating pulse itself as well as the generator signals themselves. In addition, the circuit does not entirely cut off the high frequency signals during the time that the signals are not being modulated by a pulse.

This invention provides a circuit for overcoming the above disadvantages. The circuit does not require the generation of high frequency signals on a push-pull basis as in modulators now in use and, therefore, can receive the high frequency signals from standard generators. Furthermore, it requires only diodes, preferably vacuum diodes, to modulate the high frequency signals. Since the circuit does not require the use of any multi-grid vacuum tubes to produce the modulation, it produces high frequency signals whose envelope closely follows the shape of the modulating pulse. It includes features which eliminate any leakage of high frequency signals during the time that the signals are not being modulated. The circuit is also relatively simple, compact and inexpensive.

An object of this invention is to provide a circuit for modulating, as by a pulse, signals having a relative high frequency.

2

Another object is to provide a pulse modulator of the above character adapted for use with standard signal generators.

A further object is to provide a pulse modulator of the above character for producing a pulse of signals having an optimum shape and desirable characteristics, especially where the leading edge of the pulse is relatively sharp.

A still further object is to provide a pulse modulator of the above character which is relatively simple, compact and inexpensive.

Other objects and advantages will be apparent from a detailed description of the invention and from the appended drawings and claims.

The single figure is a circuit diagram, partly in block form, illustrating one embodiment of the invention.

In one embodiment of the invention, a gas-filled tube 10, such as a hydrogen thyratron tube, is provided. The cathode of the tube 10 is connected to the movable contact and to one stationary contact of a potentiometer 12 having its other stationary contact grounded. The control grid of the tube is in series with a resistance 14 and a coupling capacitance 16, which is in turn connected to a trigger source 18 adapted to produce triggering pulses at a predetermined frequency. Negative bias for the control grid is applied at the common terminal between the resistance 14 and the capacitance 16 from a suitable bias source such as a battery 20. Positive voltage is applied to the plate of the tube 10 from a power supply 22 through a series circuit which includes a pair of resistances 24 and 26.

The common terminal between the resistances 24 and 26 is connected to a delay line 28 of the open-ended type. A connection is made from the delay line 28 to the movable contact and to one stationary contact of a potentiometer 34 having its other stationary contact grounded.

A pair of inductances 36 and 38 are connected to the cathode of the tube 10 and to the movable contact of the potentiometer 34, respectively. Capacitances 40 and 42 are provided in series across the inductances 36 and 38, and a signal generator 44 adapted to supply continuous signals at a relatively high frequency is connected to the common terminal between the capacitances 40 and 42.

A connection is made from the common terminal between the inductance 36 and capacitance 40 to the plate of a diode 46 having an interelectrode capacitance 48 which is shown by broken lines as being in parallel with the diode. A series circuit including an inductance 50 and a capacitance 52 are provided across the diode 46. The inductance 50 and the capacitance 52 have an inductive reactance at the frequency of the signals from the generator 44, and this inductive reactance is in parallel resonance with the reactance of the capacitance 48 at the generator frequency. A capacitance 54 is provided in series with the inductance 50 and capacitance 52, and a resistance 56 is in parallel with the capacitance 54 and in series with the tube 46.

The cathode of a diode 58 similar to the diode 46 is connected to the common terminal between the inductance 38 and the capacitance 42. The diode 58 has an inter-electrode capacitance 60 similar to the capacitance 48. An inductance 62, a capacitance 64, a capacitance 66 and a resistance 68 are connected to the tube 58 and to one another in a similar arrangement to that disclosed above for the inductance 50, the capacitances 52 and 54 and the resistance 56. Connections are made from the capacitances 54 and 66 and the resistances 56 and 68 to a grounded resistance 70. The voltage across the resistance 70 serves as the output for introduction to subsequent stages (not shown).

The bias source 20 normally biases the control grid of the gas-filled tube 10 sufficiently negative to prevent the tube from conducting. During the time that the tube 10 is cut off, the delay line 28 is charged through a circuit which includes the power supply 22, the resistance 24, the delay line 28 and the potentiometer 34. When the voltage on the delay line 28 becomes substantially equal to the voltage from the power supply 22, a triggering pulse is introduced from the source 18 to the control grid of the tube 10. This pulse causes the tube 10 to become conductive so that current flows through a circuit including the power supply 22, the resistances 24 and 26, the tube and the potentiometer 12.

When the current starts to flow through the tube 10, the voltage on the plate of the tube drops and produces a negative impulse on the plate. This impulse travels through the delay line 28 and returns back to the common terminal between the resistances 24 and 26 after being reflected at the end of the delay line. The tube 10 conducts during the time that the negative impulse is travelling through the delay line and provides a continuous circuit for the discharge of the delay line. Since the discharge of the delay line 28 occurs through a circuit including the delay line, the resistance 26, the tube 10, the potentiometer 12 and the potentiometer 34, a positive pulse of voltage is produced across the potentiometer 12 for a period of time determined by the characteristics of the delay line. Similarly, a negative pulse of voltage is produced across the potentiometer 34 for the same length of time.

The characteristics of the delay line determine the duration of the pulses produced across the potentiometers 12 and 34, since the voltage on the plate of the tube 10 drops below the value required to maintain current through the tube when the impulse travelling through the delay line returns to the common terminal between the resistances 24 and 26. This causes the tube to become cut off and the discharge circuit for the network to be opened. Upon the cut-off of the tube 10, the power supply 22 again starts to charge the delay line 28. The charge and subsequent discharge of the delay line occur at a frequency determined by the repetition rate of the pulses from the source 18. The repetition rate is sufficiently low so that the delay line becomes charged substantially to the voltage of the power supply 22 during the periods between successive triggering pulses.

The pulses of equal amplitude from the potentiometers 12 and 34 modulate continuous signals introduced to the circuit at a relatively high frequency from the generator 44. The signals from the generator 44 are isolated from the tube 10 and the delay line 28 by the choking action of the inductances 36 and 38. The generator signals which are modulated by a positive pulse of voltage from the potentiometer 12 are introduced to the plate of the tube 46. The cathode of the tube 46 is normally biased at a positive potential by current which has flowed through the tube 46 and the capacitance 54 during previous modulation periods. This positive bias is retained across the capacitance 54 during the periods between the pulse modulations, since the time constant of the capacitance and the resistance 56 is relatively large.

Because of the positive bias on the cathode of the diode 46, the diode does not conduct when unmodulated signals from the generator 44 are introduced to it. Any unmodulated signals passing through the inter-electrode capacitance 48 are relatively weak compared to the modulated signals passing through the diode and are further considerably attenuated by the parallel resonant circuit provided by the inter-electrode capacitance 48, the inductance 50 and the capacitance 52. The capacitance 52 is provided in series with the inductance 50 to prevent the capacitance 54 from being relieved of its bias by discharging through a circuit including the inductance 50.

By modulating the signals from the generator 44 with a positive pulse, the voltage on the plate of the diode 46 is raised above the voltage on the cathode during the positive half of each generator signal that is modulated. This causes the diode 46 to pass the positive half of each signal produced by the generator 44 during each positive pulse from the potentiometer 12. Similarly, the capacitance 66 produces a negative bias which causes only the negative portions of each generator signal during the negative pulse from the potentiometer 34 to pass through the tube 58. The positive and negative portions of the generator signals are combined to produce across the resistance 70 continuous signals similar to the signals produced by the generator.

The circuit disclosed above has several important advantages. Since the generator signals are not produced on a push-pull basis, the circuit is able to operate satisfactorily when connected to a standard generator. Because of the elimination of any gating stages requiring multi-grid vacuum tubes, the circuit operates to eliminate any signals having frequencies represented by the modulating pulse itself.

The circuit is also able to respond with high fidelity to modulating pulses having a fast rise time and short duration. For example, the pulse modulated signals produced across the resistance 70 may have a rise time of as little as 0.01 microsecond and may continue for approximately 0.1 microsecond when the generator frequency is less than 100 megacycles. The circuit disclosed above is also simpler than circuits now in use because of the elimination of any push-pull generator and any multi-grid gating stages. In addition, the positive and negative pulses of equal amplitude from the potentiometers 12 and 34 minimize any distortion in the output signals produced across the resistance 70. The length of the modulating pulses can also be easily varied by removing one network 28 and substituting another network producing a different delay.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A pulse modulator, including, means for forming a positive pulse having a predetermined duration, means for simultaneously forming a negative pulse having characteristics corresponding to the positive pulse, means for mixing with the positive and negative pulses continuous signals having a relatively high frequency, first gating means for passing only the positive portion of each high frequency signal during the formation of the positive pulse, second gating means for passing only the negative portion of each high frequency signal during the formation of the negative pulse, and means for mixing the gated signals to produce a carrier frequency pulse.

2. A pulse modulator, including, means for forming a positive pulse having a predetermined duration, means for simultaneously forming a negative pulse having characteristics corresponding to the positive pulse, means for mixing with each pulse continuous signals having a relatively high frequency, first unidirectional means triggered by the negative pulse to pass only the negative portion of each high frequency signal during the pulse, second unidirectional means triggered by the positive pulse to pass only the positive portion of each high frequency signal during the pulse, and means for mixing the signals passing through the unidirectional means to produce continuous signals for the duration of each pulse.

3. A pulse modulator, including, means for forming a positive pulse having a predetermined duration, means for simultaneously forming a negative pulse having characteristics corresponding to the positive pulse, means for mixing with the positive and negative pulses continuous signals having a relatively high frequency, first gating means connected to the mixing means to pass positive signals, means associated with the gating means for biasing the gating means to pass only the positive portions of the high frequency signals occurring during each positive pulse, second gating means connected to the mixing means to pass negative signals, means associated with the second gating means for biasing the gating means to pass only the negative portions of the high frequency signals occurring during each negative pulse, and means associated with the biasing means for producing during each pulse continuous signals having the high frequency.

4. A pulse modulator, including, means for forming a positive pulse having a predetermined duration, means for simultaneously forming a negative pulse having characteristics corresponding to the positive pulse, means for mixing with the positive and negative pulses continuous signals having a relatively high frequency, first gating means connected to the mixing means to pass positive signals, means associated with the gating means for biasing the member to pass only the positive portions of the high frequency signals occurring during the positive pulse, means for preventing the passage of continuous signals through the first gating means between positive pulses, second gating means connected to the mixing means to pass negative signals, means associated with the gating means for biasing the member to pass only the negative portions of the high frequency signals occurring during the negative pulses, means for preventing the passage of continuous signals through the second gating means between negative pulses, and means associated with the biasing means to combine the signals passing through the biasing means so as to produce during each pulse continuous signals having the high frequency.

5. A pulse modulator, including, means for forming a positive pulse having a predetermined duration, means for simultaneously forming a negative pulse having characteristics corresponding to the positive pulse, means for mixing with the positive and negative pulses continuous signals having a relatively high frequency, a first diode connected to the mixing means to pass the positive portions of the high frequency signals during each pulse modulation, a first capacitance connected to the diode to bias the diode to pass only the positive portions of the high frequency signals during each pulse modulation, a second diode connected to the mixing means to pass the negative portions of the high frequency signals during each pulse modulation, a second capacitance connected to the second diode to pass only the negative portions of the high frequency signals during each pulse modulation, and means for mixing the signals passing through the first and second diodes to produce continuous signals during each pulse modulation.

6. A pulse modulator, including, means for forming a positive pulse having a predetermined duration, means for simultaneously forming a negative pulse having characteristics corresponding to the positive pulse, means for mixing with the positive and negative pulses continuous signals having a relatively high frequency, a first diode connected to the mixing means to pass the positive portions of the high frequency signals during each pulse modulation, a first capacitance connected to the diode to bias the diode to pass only the positive portions of the high frequency signals during each pulse modulation, means connected to the diode to form a circuit resonant at the frequency of the continuous signals to minimize the passage of any continuous signals between pulse modulations, a second diode connected to the mixing means to pass the negative portions of the high frequency signals during each pulse modulation, a second capacitance connected to the second diode to bias the diode to pass only the negative portions of the high frequency signals during each pulse modulation, means connected to the second diode to form a circuit resonant at the frequency of the continuous signals for minimizing the passage of any continuous signals between pulse modulations, and means for mixing the signals passing through the first and second diodes to produce continuous signals during each pulse modulation.

7. A pulse modulator, including, means for producing triggering pulses, means for forming a positive pulse having a predetermined duration upon the production of each triggering pulse, means for simultaneously forming a negative pulse having characteristics corresponding to those of the positive pulse upon the production of each triggering pulse, means for producing continuous signals having a relatively high frequency, a first tube having a cathode and a plate, the plate of the tube being connected to receive the continuous signals and the positive pulses, a capacitance being connected to the cathode of the tube to bias the tube for the passage of the positive portions of the continuous signals during the formation of the positive pulses, a second tube having a cathode and a plate, the cathode of the second tube being connected to receive the continuous signals and the negative pulses, a capacitance being connected to the plate of the second tube to bias the tube for the passage of the negative portions of the continuous signals during the formation of the negative pulses, and means for combining the signals passing through the first and second tubes to produce during each pulse continuous signals having the high frequency.

8. A pulse modulator, including, means for producing triggering pulses, first means for forming a positive pulse having a predetermined duration upon the production of each triggering pulse, second means for simultaneously forming a negative pulse having characteristics corresponding to those of the positive pulse upon the production of each triggering pulse, means for producing continuous signals having a relatively high frequency, a first tube having a cathode and a plate, the plate of the tube being connected to receive the continuous signals and the positive pulses, a capacitance being connected to the cathode of the tube to bias the tube for the passage of the positive portions of the continuous signals during the formation of the positive pulses, a reactance being connected across the first tube to produce a resonance with the reactance in the tube at substantially the frequency of the continuous signals, a second tube having a cathode and a plate, the cathode of the second tube being connected to receive the continuous signals and the negative pulses, a capacitance being connected to the plate of the second tube to bias the tube for the passage of the negative portions of the continuous signals during the formation of the negative pulses, a reactance being connected across the second tube to produce a resonance with the reactance in the tube at substantially the frequency of the continuous signals, and means for receiving the signals passing through the first and second tubes to produce during each pulse continuous signals having the high frequency.

9. In a pulse modulator as set forth in claim 8, a choke connected between the first pulse forming means and the plate of the first tube to isolate the pulse forming means from the tube, and a shoke connected between the second pulse forming means and the plate of the second tube to isolate the pulse forming means from the tube.

HOWARD F. LYNN.

References Cited in the file of this patent

UNITED STATES PATENTS

| Number | Name | Date |
| --- | --- | --- |
| 2,462,852 | Frankel | Mar. 1, 1949 |